United States Patent [19]

Greis et al.

[11] 4,207,785
[45] Jun. 17, 1980

[54] DOUBLE END METAL TURNING

[75] Inventors: Howard A. Greis; Robert F. Bruinsma, both of Holden, Mass.

[73] Assignee: Kinefac Corp., Worcester, Mass.

[21] Appl. No.: 953,629

[22] Filed: Oct. 23, 1978

[51] Int. Cl.² ............... B23B 3/00; B23B 3/16; B23B 5/22

[52] U.S. Cl. .................... 82/2 R; 82/8; 82/48; 82/86; 82/101; 279/1 DC; 279/50; 29/36

[58] Field of Search ........... 82/2 R, 2.5, 2.7, 8, 82/9, 46, 48, 86, 101, 1; 29/38 B, 36 R, 36 C; 279/1 DC, 50, 51, 110, 46

[56] References Cited

U.S. PATENT DOCUMENTS

| 539,964 | 5/1895 | Spencer | 82/2.5 |
|---|---|---|---|
| 846,000 | 3/1907 | Blackburn | 82/2 R |
| 1,571,323 | 2/1926 | Cole et al. | 82/8 |
| 1,587,261 | 6/1926 | White | 82/2 R |
| 2,372,592 | 3/1945 | Lovely | 279/1 DC |
| 2,608,415 | 8/1952 | Drissner | 279/1 DC |
| 3,481,234 | 12/1969 | Luce, Sr. | 82/48 |
| 4,064,774 | 12/1977 | Maddock | 82/8 |

*Primary Examiner*—Harrison L. Hinson
*Attorney, Agent, or Firm*—Charles R. Fay

[57] ABSTRACT

A machine for turning successive axially fed work pieces at both ends simultaneously by means of a double-ended segmentally actuated collet construction wherein one collet has a fixed collet chuck and the other has a movable collet chuck; and rigidly controlled and guided means to move the latter to simultaneously close both collets in combination with a tool slide which is considerably longer than the distance between the collets and along which are adjustably mounted a plurality of turning tools, and which is actuated in timed relation to the feed and collet actuation. A single cam shaft with adjustable cams controls all motions.

25 Claims, 4 Drawing Figures

DOUBLE END METAL TURNING

BACKGROUND OF THE INVENTION

In the area of machine tools, particularly in metal turning, there has long been a need for a machine providing high speed production of long thin shaft-like parts on which most of the turning work is on each end of the part, simultaneously, to provide good axial location repeatability of the turned forms and having positive cutting tool penetration rates. At the same time, of course, it is a consideration as always to provide a machine tool of the class described which is relatively simple in construction, positive in actuation, and capable of having wide range special cycle characteristics which in this case is achieved by simply changing or adjusting cams.

SUMMARY OF THE INVENTION

The metal turning machine of the present invention provides a fixed rigid frame into which is integrally mounted a common shaft of heavy construction, e.g., having a diameter of three inches or thereabouts. This shaft acts as a sliding guide as well as a pivot guide for a tool slide which is of a full length permitting the mounting of a number of tools in precise axial location with respect to each other and to the work, which is fed seriatim in end-to-end relation in a direction parallel to the shaft and the tool slide. A simple single cam shaft has cams which actuate the tool slide to advance the tools to the work and also to intermittently feed work pieces to a spindle and the collets at the correct time to clamp the work and to actuate the mechanism in timed relation.

This spindle and collet assembly comprises a fixed collet chuck with a collet in it adapted to be moved relative to the fixed chuck to close on a work piece at the trailing end thereof. A movable chuck, which may be referred to as the clamping collet chuck, is associated with a movable collet arranged in reverse to the first collet and it is provided with a collet carriage, again actuated by a cam on the cam shaft, which moves the movable collet toward the fixed collet causing the latter to be closed upon the work piece and in turn being closed by the clamping collet chuck, thereby holding the work piece at both ends.

In this case the ends of the work piece extend from both collets and can be acted upon by tools on the tool slide, and also if desired by other tools, so that it is seen that special work can be done according to the disposition and types of tools applied to the tool slide, and because the collet assembly is easily adjusted as to length for different work pieces, it can minimize overhang from the collet to the area being worked upon by the tools.

One of the features of the present invention resides in the fact that the work pieces can be fed as actuated by cams on the cam shaft in a plural arrangment, i.e., there may be two, three or more work pieces in units axially arranged in the collet assembly, the leading end of the leading work piece being acted upon by one tool, and the trailing end of a trailing work piece being acted upon by another tool. The action, of course, is repetitive so that as the leading end of a work piece is being acted upon, and there being multiple piece in the collet assembly, the trailing end of the leading work piece has already been turned by the first tool.

The novel features of the present invention reside in the colleting by moving one movable spindle bearing chuck toward the axially fixed spindle bearing; the collet assembly is adjustable; the collet closing force is mechanically controlled for simple and easy adjustment; the provision of the full length tool carriage slide; and the central common shaft which provides the pivot for the tool slide and for axially moving the head stock bearing or spindle bearing for actuating the collet.

PREFERRED EMBODIMENT OF THE INVENTION

Figure 1:
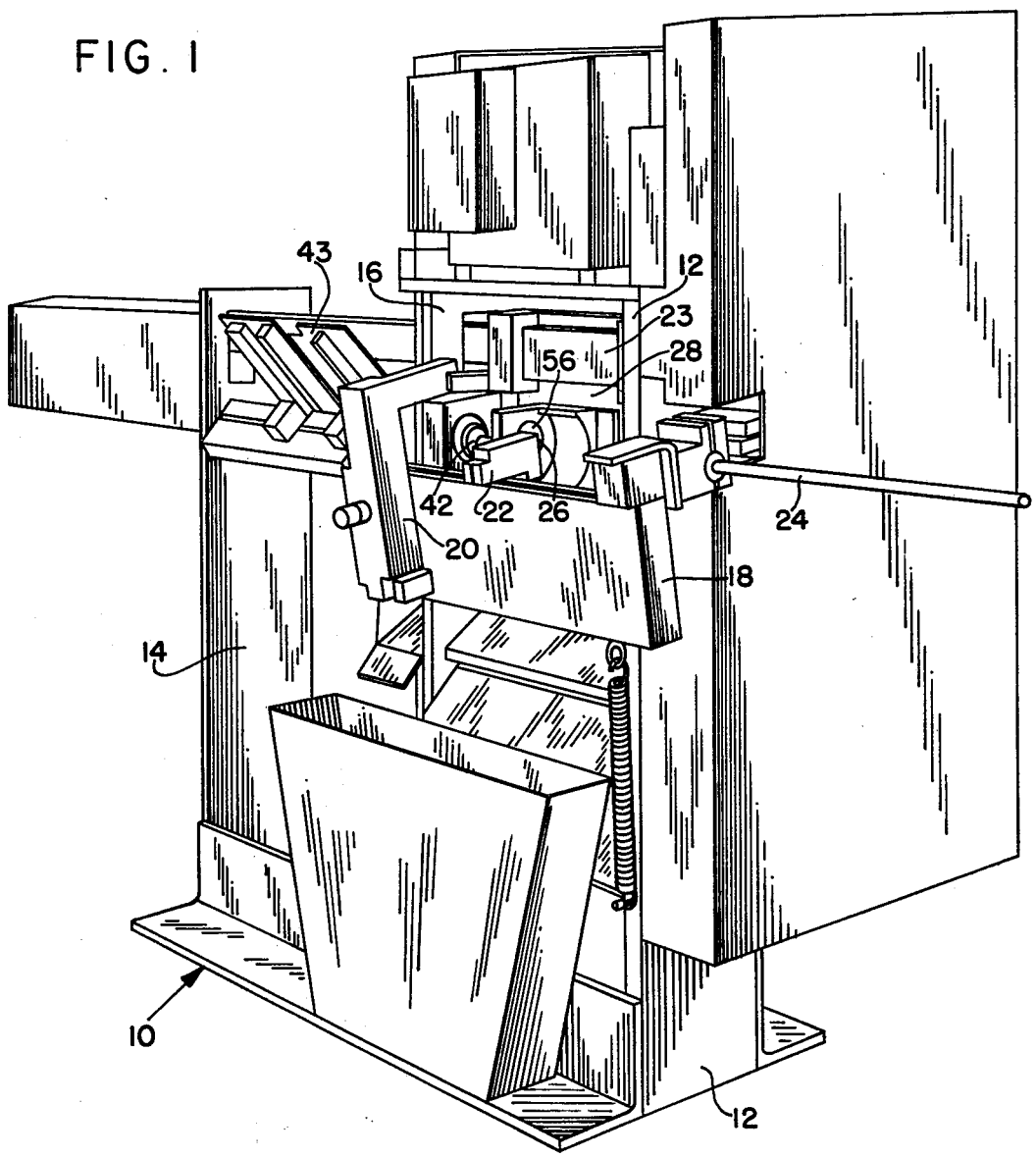
FIG. 1 is a perspective view illustrating the machine as a whole.

The machine of the present invention is provided with a heavy base construction 10 upon which are mounted relatively heavy upright members as for instance at 12, 14 and 16. As shown in FIG. 1, there is a spring-loaded pivoted tool arm and tool slide or the like 18 which is operated by a cam operated member 20 to rock back and forth as will be more fully described hereinafter. On the tool slide there may be adjustably mounted one or more tool holder 22 and between the solid uprights 16 and 12 there is provided an overhead fixed heavy rectangular guide 23 parallel to the tool slide. The member 24 illustrates a stop which may be used for the work piece and at 26 there is what amounts to a headstock.

Figure 3:
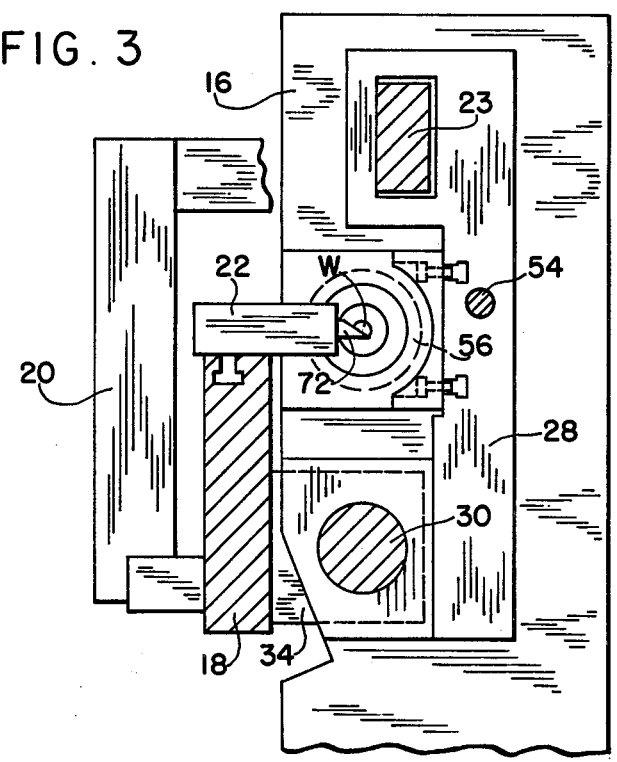
FIG. 3 is a sectional view showing the supports for the collet carriage.

The reference numeral 28 represents a movable slidable collet carriage which reciprocates to open and close collet chucks for holding the work to be operated upon by tools on the tool holders such as that at 22. Reference is made to FIG. 3 where the carriage is shown generally as at 28 slidably guided on the overhead rectangular fixed member 23 and also on the very heavy fixed shaft 30. The arm and tool slide 18 is pivoted on this shaft, the position of the headstock being indicated as shown. It will be appreciated that the collet carriage 28 is heavy and rigid and extremely well guided, avoiding any vibration, and also the tool slide 18 is very evenly guided by the shaft 30 which is of relatively large diameter, say about three inches.

Figure 2:
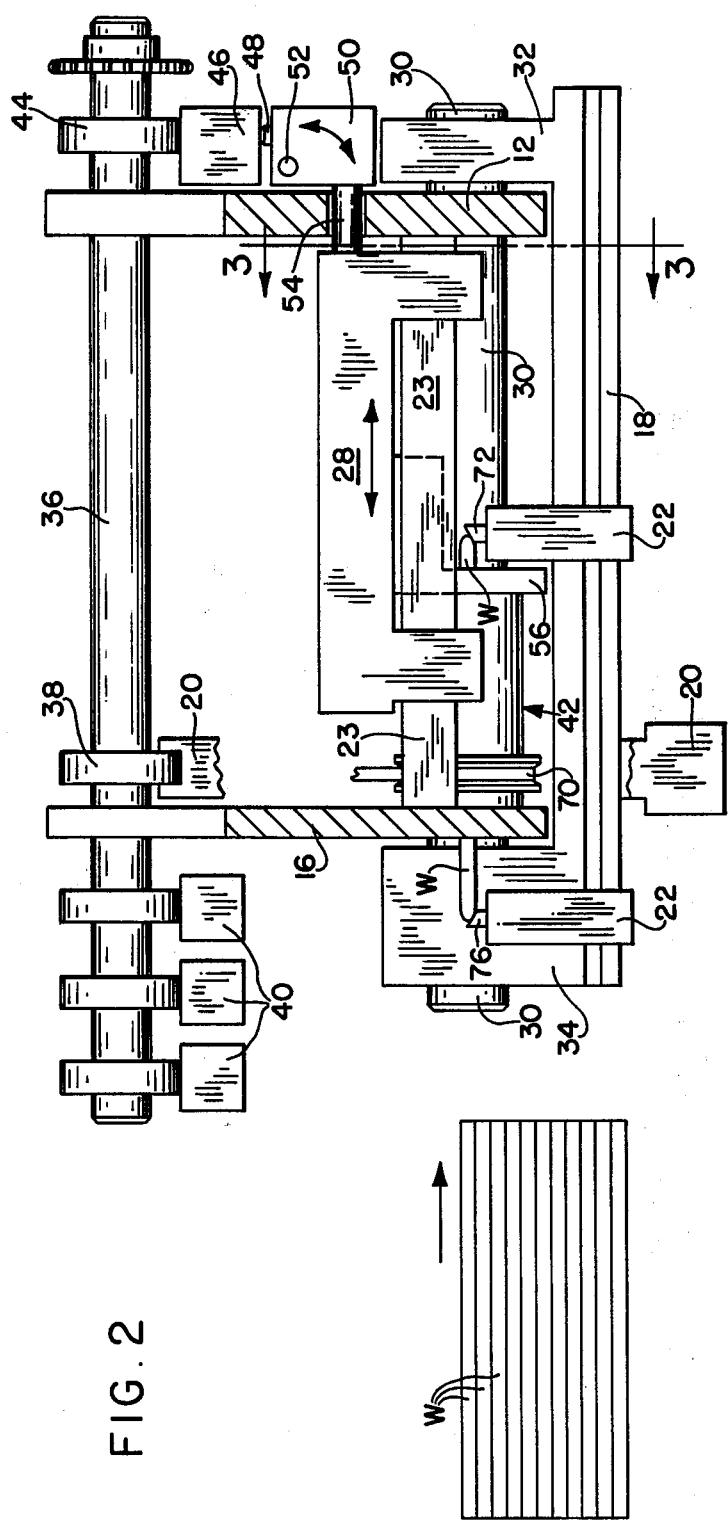
FIG. 2 is a diagram illustrating the operation and construction of the machine.

As shown in FIG. 2, the tool slide 18 is mounted on a pair of very rugged pivot arms 32,34 which surround and are guided by the heavy shaft 30 and this very rugged and rigid construction serves to make the machine extremely accurate and fast in its operation with no vibration in the entire machine due to the heaviness of the construction.

Mounted on the frame at the rear there is a single cam shaft 36 which carries a cam 38 to rock the tool slide 18 on its arms 32, 34; there is a series of cams indicated at 40 which control a generally commercial work feeder by means of pneumatic valves (not shown), and it is to be understood that this work feeder feeds axially aligned work pieces seriatim into the spindle collet assembly generally indicated at 42 where they are clamped and operated upon by the tools on the tool holders 22,22. A work piece hopper is indicated at 43.

There is a further cam 44 on cam shaft 36 which rectilinearly moves a block 46 having engagement 48 with a pivoted block 50 so that as cam 44 rotates, it reciprocates block 46 which in turn causes block 50 to pivot about its pivot 52 and thereby rectilinearly actuate a rod 54 which reciprocates the collet actuator carriage, which has been indicated as at 28, the same being spring-loaded for return.

Figure 4:
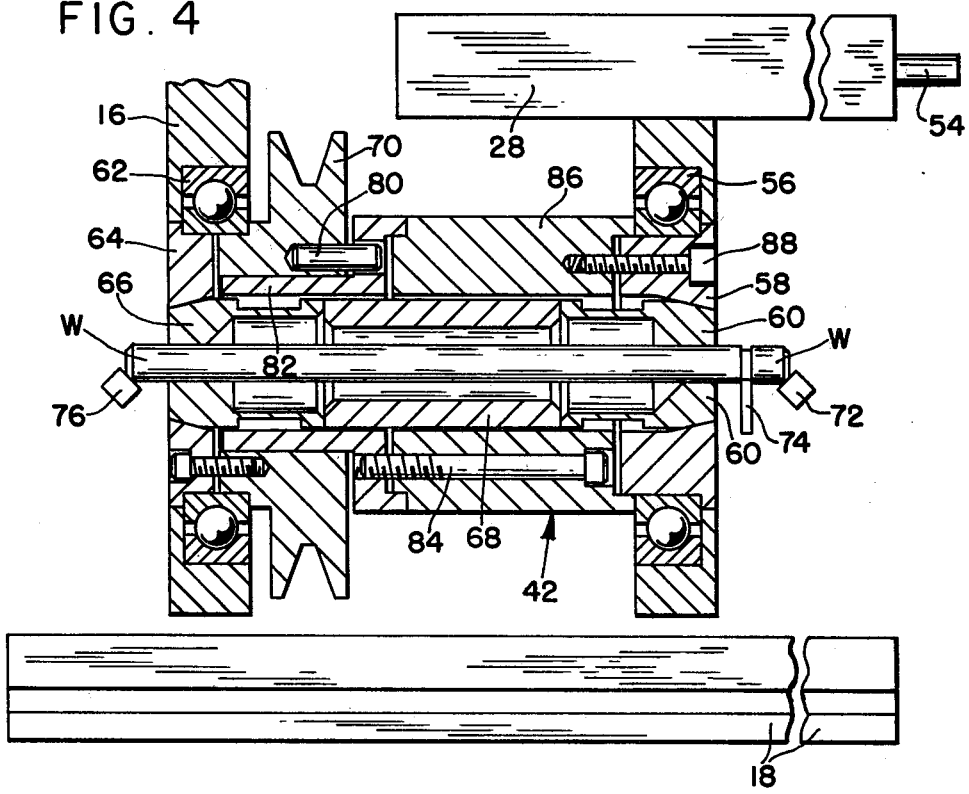
FIG. 4 is a sectional view of the collet chuck assembly.

Turning now to FIG. 4 there is shown the collet or spindle carriage 28 having a reciprocal motion as described, this carriage being connected through a bearing 56 to a clamping collet chuck 58 which operates the clamping collet 60 in timed relation to the feed of the work pieces which are indicated as at W.

The machine frame member 16 carries a fixed bearing 62 having a fixed collet chuck 64 for operating a collet 66 in a fixed location, and the reference character 68 in this case illustrates a spacer which can be changed and replaced in order to space the collets 60 and 66 closer together or farther apart. As the work pieces W are fed axially seriatim into the collets, at a predetermined instant, the collet carriage 28 is moved to the left, FIG. 2, causing clamping collet chuck 58 to move collet 60 to the left in turn moving collet 66 to the left, clamping the work piece between the ends thereof with the leading and trailing ends exposed. Means is provided as for instance pulley 70 to rotate the entire assembly while the tools act upon the extending ends of the work piece as is illustrated in FIG. 4 by the positioning of the tools 72, 74 or 76.

It will be appreciated that the tool slide 18 is longer than the working areas of the tools on the work piece held in the collets, and several work holders can be applied to the tool slide to work at the extending end portions of the work piece or inwardly thereof as indicated by the tool 74.

It is also pointed out that more than one work piece may be clamped at a time, so that in this case the trailing end of the trailing work piece is operated upon by tool 76 while the leading end of the leading work piece is cut as at 72, the trailing end of the leading work piece already having been operated upon by tool 76.

The mechanical cam system with the single cam shaft provides automatic clamping force control actuating the collets with closely receivable and uniform clamping pressure to a range of diameter variations and also lengths of work pieces and the type of work actually provided on the work pieces themselves.

Pulley 70 is doweled as at 80 to a slidable cylindrical member 82, in turn bolted as at 84 to a sleeve 86, in turn bolted as at 88 to the collet chuck 58 providing for the necessary axial motion of chuck 58 under influence of carriage 28 and collet 66 to close both the latter and collet 60 simultaneously. The pulley 70 is bolted to chuck 64 which rotates collet 66 by friction, and this in turn drives sleeve 68 and collet 60 also by friction. The distance between collets is thus rigidly controlled.

It is believed that it will be clear that all the objectives of the invention are carried out with high speed repeatability and close control of all of the motions and actions of the machine and with the extremely rigid base and the construction of the collet carriage and its supports on guides 23 and 30 as well as the pivot support of the tool slide 18 on rod shaft 30. The action of all these parts is extremely smooth while at the same time being relatively fast for high speed production of the various parts.

We claim:

1. A collet actuating apparatus comprising a support, a pair of coaxial rotary bearings in spaced relation in said support, a collet chuck in each bearing, a collet for each collet chuck, said collets facing in opposite directions and being axially spaced,
   one of said bearings being axially fixed, the other of said bearings having an axial motion with respect thereto, and means to move the latter,
   the movable bearing moving means moving its collet axially with respect to the fixed collet, causing the collets to close upon predetermined pressure applied to said movable collet chuck,
   said collets being adapted to grasp work pieces between their ends, with the ends extending from the collets.

2. The collet actuating apparatus of claim 1 wherein the movable collet chuck serves as a spindle bearing.

3. The collet apparatus of claim 1 including removable and replaceable spacers adapted to be placed between the two collets for adjusting the distance between the collets.

4. The collet apparatus of claim 1 including means for axially adjusting the movable bearing and its clamping collet chuck.

5. The collet apparatus of claim 1 wherein said two collets are rigidly connected.

6. Turning apparatus comprising a frame, spaced aligned collets to hold a work piece rotatably in said frame in a predetermined position with the ends of the work piece extending from the collets, means to rotate the collets, a full length tool slide mounted on said frame, and means for moving said tool slide toward and from the work piece held by the collets,
   a plurality of tool holders adjustably mounted on said tool slide in a longitudinal direction thereon, said tool holders being spaced at both end portions thereof so as to work on both ends of a work piece simultaneously.

7. The turning apparatus of claim 6 including a tool for each tool holder and wherein said collets accept a plurality of work pieces in end to end butting relationship, one of said tools working at the forward portion of one work piece and another tool working on the rear end portion of a succeeding work piece.

8. The turning apparatus of claim 6 wherein the collets each include a collet chuck, one chuck being relatively fixed and the other being movable, a collet moving carriage, the latter acting on the collets to close both of the collets on the work piece.

9. Turning apparatus comprising a frame including spaced members, a shaft mounted on and between said spaced members, a pair of spaced pivot arms mounted on said shaft for pivoting thereon,
   a tool slide mounted on said arms for pivoting motion, means for pivoting said arms and tool slide on said shaft, a plurality of turning tools longitudinally adjustably mounted on said tool slide,
   a spindle and collet assembly mounted on said frame between said pivoted arms, means feeding work pieces seriatim through said spindle and collet assembly, means for opening and closing the said spindle and collet assembly to accept, clamp, and release work pieces in timed relationship with respect to the operation of the means pivoting said pivot arms and tool slide,
   one of said tools being positioned to operate on the leading end portion of the work piece in the spindle and collet assembly and another of said tools being positioned to operate on the trailing end portion of the work piece in the spindle and collet assembly.

10. The turning apparatus of claim 9 including a collet closing motion carriage, means for moving the carriage in timed relation with respect to the work piece feed and the tool slide action, said carriage actuating said collet clamp motion device opening and closing said spindle collet assembly in timed relation to the work piece feed.

11. The turning apparatus of claim 10 wherein said spindle and collet assembly includes two collet chuck members located in spaced relation with respect to each other, one of said collet chuck members being substantially fixed and the other being movable with said carriage and acting on the collets to close them.

12. The turning apparatus of claim 9 including a collet opening and closing carriage, means to move the same in timed relation with respect to the work piece feed, said carriage being slidably mounted on said shaft.

13. The turning apparatus of claim 8 including a cam shaft, a cam for moving the clamp motion carriage, and a cam for actuating the tool slide.

14. The turning apparatus of claim 13 including a series of cams on the cam shaft for operating the work feed, all of said cams being arranged to work in timed relation with respect to each other.

15. The turning apparatus of claim 13 wherein said cams are adjustable.

16. The turning apparatus of claim 15 wherein the clamp motion carriage moves in parallel to the cam shaft and the tool slide.

17. A turning apparatus comprising a frame including spaced members, a shaft mounted on said spaced members, a pair of spaced pivot arms mounted on said shaft for pivoting thereon, a tool slide mounted on said arms for pivoting motion therewith, means for pivoting said arms, a plurality of turning tools longitudinally adjustably mounted on said tool slide, a spindle and collet assembly mounted on said frame between said pivoted arms, said spindle and collet assembly accepting work pieces seriatim, means for opening and closing the said spindle and collet assembly to accept, clamp, and release work pieces in timed relationship with respect to the operation of the means pivoting said pivot arms and said tool slide, one of said tools being positioned to operate on the leading end of the work piece in the spindle and collet assembly and another of said tools being positioned at the trailing end of the work piece in the spindle and collet assembly.

18. The turning apparatus of claim 17 including a collet closing and opening, means for moving the carriage in timed relation with respect to the tool slide actuation.

19. The turning apparatus of claim 18 wherein said spindle and collet assembly includes two collet members located in spaced relation with respect to each other, one of said collet members being substantially fixed and the other being movable with said carriage.

20. The turning apparatus of claim 19 wherein the carriage moves the movable collet toward the fixed collet causing the same to close.

21. The turning apparatus of claim 17 wherein said carriage is slidably guided on said shaft.

22. The turning apparatus of claim 21 including a cam shaft, a cam thereon for moving the collet closing carriage, and a cam for actuating the tool slide.

23. The turning apparatus of claim 22 including a series of cams on the cam shaft for operating the work piece feed, all of said cams being arranged to operate in timed relation with respect to each other.

24. The turning apparatus of claim 22 wherein the collet closing carriage moves in a direction parallel to the cam shaft and the tool slide.

25. The turning apparatus of claim 24 including a device to transfer the motion of the cam actuating the collet closing carriage to a right angle.

* * * * *